(12) United States Patent
Markowitz et al.

(10) Patent No.: US 6,673,246 B2
(45) Date of Patent: Jan. 6, 2004

(54) REUSABLE POLYSILSESQUIOXANE ADSORBENTS FOR POLLUTANTS

(75) Inventors: Michael A. Markowitz, Burke, VA (US); Mark C. Burleigh, Alexandria, VA (US); Bruce P. Gaber, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 82 days.

(21) Appl. No.: 10/084,492

(22) Filed: Feb. 28, 2002

(65) Prior Publication Data

US 2003/0159997 A1 Aug. 28, 2003

(51) Int. Cl.$^7$ .................................................. C02F 1/42
(52) U.S. Cl. ........................................ 210/670; 210/674
(58) Field of Search .................................. 210/670, 674

(56) References Cited

U.S. PATENT DOCUMENTS

| | | | | |
|---|---|---|---|---|
| 4,469,805 A | * | 9/1984 | Kofke et al. .................. 502/33 |
| 5,268,160 A | * | 12/1993 | Albal et al. .................. 423/584 |
| 5,321,102 A | * | 6/1994 | Loy et al. .................... 525/474 |
| 5,396,020 A | * | 3/1995 | Lansbarkis .................. 585/825 |
| 5,449,853 A | * | 9/1995 | Lansbarkis et al. |
| 6,548,690 B2 | * | 4/2003 | Mimoun ...................... 556/453 |

* cited by examiner

*Primary Examiner*—Chester T. Barry
(74) *Attorney, Agent, or Firm*—George A. Kap; John J. Karasek

(57) ABSTRACT

This invention pertains to adsorption by an adsorbent of an adsorbate and to regeneration of the loaded adsorbent. The adsorption includes contacting an adsorbent selected from arylene-bridged polysilsesquioxanes and derivatives thereof with an adsorbate selected from aromatics and heterocyclics, particularly monocyclic heterocyclics containing carbon and nitrogen atoms in a 6-member non-aromatic ring, for a period of time sufficient to adsorb all or part of the adsorbate by the adsorbent. Regeneration of the loaded adsorbent includes removing all or part of adsorbate from the adsorbent by means of an alcohol wash or by thermal desorption of the adsorbent containing adsorbate.

7 Claims, 3 Drawing Sheets

SILISESQUIOXANE MONOMER

GENERIC SILSESQUIOXANE MONOMER

US 6,673,246 B2

REUSABLE POLYSILSESQUIOXANE ADSORBENTS FOR POLLUTANTS

BACKGROUND OF THE INVENTION

1. Field of the Invention

This invention pertains to removal of adsorbate materials with an arylene-bridged polysilsesquioxane adsorbent with engineered porosity and to regeneration of the loaded adsorbent.

2. Description of Related Art

The introduction of toxic pollutants can have a severe impact on the many organisms that live in aquatic ecosystems. Phenols, including phenolic compounds, are some of the most common hazardous chemicals introduced by man into such environments. Nitrophenols are introduced by effluent waste from pesticide, explosives and dye industries, and agricultural runoff. Chlorinated phenols are used as decoloring agents in pulp and paper manufacture, as wood preservatives, and are a decomposition product of many herbicides. Of major concern is the stability of these compounds once they enter the environment. Phenols are persistent pollutants that have been found in water, soil, and air samples around the globe, as well as in animal tissues. They have been designated as priority pollutants by the U.S. Environmental Protection Agency.

A variety of techniques have been implemented to purify water contaminated with phenols. Ozonolysis, photolysis, and photocatalytic decomposition have all been used with limited success. The adsorption of phenols into solid supports, such as activated carbons, allows for their removal from water without the addition of chemicals or ultraviolet rediation. Activated carbons have a large adsorption capacity for a variety of organic pollutants but are cost prohibitive due to high initial costs, difficult regeneration, and disposal costs. There is a clear need for a new adsorbent technology for the removal of phenols and other materials from wastewater and the remediation of contaminated sites. For any sorbent to be feasible, it must combine high adsorption capacity and fast adsorption kinetics with inexpensive regeneration. Functional mesoporous molecular sieves may be designed to satisfy all three criteria.

Mesoporous molecular sieves are synthesized using a surfactant template approach that creates large surface areas and internal pore volumes. These characteristics have led to their application as catalytic and adsorbent materials. Although it has been used primarily to synthesize metal oxides, the surfactant template approach is an attractive route for engineering the porosity of a wide variety of new materials.

Lansbarkis U.S. Pat. No. 5,396,020 describes a process for separating hydrocarbons using aryl-bridged polysilsesquioxanes. This 1995 patent describes a chromatographic process to separate at least two classes of hydrocarbons of a solution using an aryl-bridged polysilsesquioxane.

Loy U.S. Pat. No. 5,321,102 describes molecular engineering of porous silica using aryl templates. This 1992 patent describes a process for preparing microporous polysilsesquioxe materials.

OBJECTS AND BRIEF SUMMARY OF THE INVENTION

An object of this invention is removal of pollutants or adsorbates with a high capacity adsorbent with engineered porosity that is an arylene-bridged polysilsesquioxane or a derivative thereof.

Another object of this invention is removal of phenolic and heterocyclic pollutants with an adsorbent that is an arylene-bridged polysilsesquioxane or a derivative thereof from wastewater.

Another object of this invention is removal or adsorption of more than 90%, on weight basis, of pollutants from gaseous, solid and/or liquid adsorbate materials disposed in gaseous, liquid or on solid carriers quickly in a time period of less than one half hour with an adsorbent that is an arylene-bridged polysilsesquioxane or a derivative thereof.

Another object of this invention is regeneration of the loaded adsorbent that is an arylene-bridged polysilsesquioxane or a derivative thereof by means of a lower alkanol wash or thermal desorption.

Another object of this invention is regeneration of the loaded adsorbent that is an arylene-bridged polysilsesquioxane or a derivative thereof whereby at least about 90%, on weight basis, of at least one pollutant or adsorbate is removed.

These and other objects of the invention can be attained by mixing the adsorbent that is an arylene-bridged polysilsesquioxane or a derivative thereof with a polluted carrier material, removing the adsorbate or the pollutant, separating the loaded adsorbent from the carrier material, and regenerating the loaded adsorbent whereby at least 90% of the pollutant, or a mixture thereof, has been removed.

DETAILED DESCRIPTION OF THE INVENTION

This invention pertains to a method for removing pollutants or adsorbates by adsorption on an adsorbent that is an arylene-bridged polysilsesquioxane or a derivative thereof and to regeneration of the loaded adsorbent. The method includes the steps of mixing the adsorbent, or a mixture thereof, with a polluted material containing an adsorbate, and separating the loaded adsorbent from the refined material. The regeneration method includes the step of separating pollutant or adsorbate, or a mixture thereof, from the adsorbent loaded with an adsorbate, or a mixture thereof.

What is disclosed herein is the definition of the polysilsesquioxane adsorbent materials, synthesis and characterization thereof, their application as sorbent materials for the removal of aromatic and heterocyclic compounds from aqueous solutions polluted or contaminatd with such compounds and regeneration of the adsorbants. Supramolecular assemblies of cetyltrimethyl ammonium chloride surfactant were used to engineer the porosity of these adsorbent materials by surfactant templating. The organosilane monomer 1,4-bis(trimethoxysilylethyl)benzene precursor adsorbent was polymerized by base catalyzed hydrolysis and condensation reactions to form an organic-inorganic material with an alkylbenzene organic bridging group. The cetyltrimethyl ammonium chloride was then removed by extraction in acidified ethanol, giving the porous polysilsesquioxane adsorbent. This adsorbent material has been characterized by nitrogen gas sorption and x-ray diffraction. The ability of this adsorbent material to adsorb nitrophenols has been carried out by both batch and column testing. Regeneration of the arylene-bridged sorbent by washing in a lower alcohol or by thermal desorption is also disclosed.

The adsorbent is a polysilsesquioxane or a derivative thereof that is typically a porous solid which can be in particulate or monolithic forms. Contaminated or polluted materials contain at least one contaminant, and can contain a mixture of pollutants. The adsorbent is a porous solid. Regeneration of the loaded adsorbent can be accomplished either by a lower alkanol wash or by thermal desorption.

Figure 1:
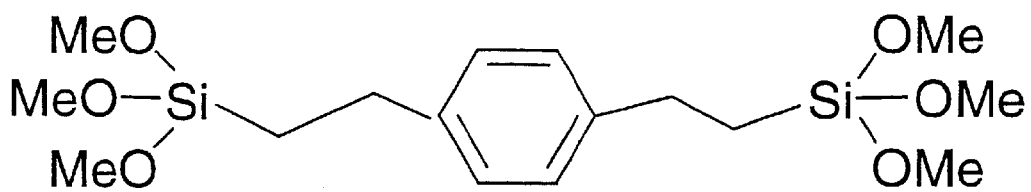
FIG. 1 shows structural formulas of silsesquioxane or 1,4-bis(trimethoxysilelylethyl)benzene monomer and the monomeric derivative of the silsesquioxane.
Figure 1:
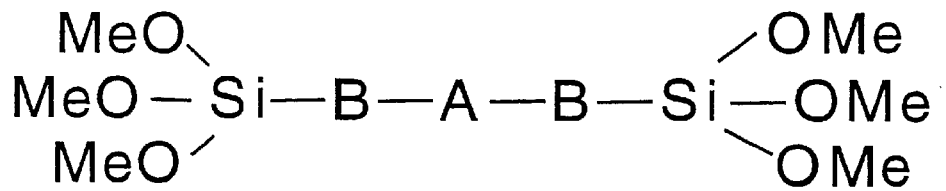

FIG. 1 shows structural formulas of suitable monomers which, when converted to polymeric form, become ceramic, 3-dimensional condensation polymeric products suitable as adsorbents for purposes herein. As shown in FIG. 1, the silsesquioxane monomer is similar in structure to the generic or derivative monomeric silsesquioxane. In FIG. 1, group A is a divalent arylene bridge between the two divalent aliphatic hydrocarbon groups B. The arylene group A can be derived from a single or multiple benzene molecules and the benzene molecules can be connected by a bond or be fused. Although the arylene substituted or unsubstituted aromatic molecules can be phenyl, biphenyl, anthracene, or other molecules, preferred is an unsubstituted single benzene group or phenylene group, shown in FIG. 1 in the silsesquioxane monomer. The divalent aliphatic hydrocarbon groups B, which can be same or different, can be saturated or unsaturated, substituted or unsubstituted, and can contain 1–6 carbon atoms. Preferably, groups B are same, are unsubstituted, saturated, and contain 1 to 2 carbon atoms. The R groups on the derivative of the silsesquioxane monomer can be same or different, saturated or unsaturated, and can contain 1 to 6 carbon atoms. Preferably, the R groups are same, are saturated and contain 1 to 2 carbon atoms.

The monomeric silsesquioxanes and derivatives thereof are converted to corresponding porous polymers in a known way, which polymers are suitable adsorbents for purposes herein and typically have Brunauer-Emmett-Teller (BET) surface area in the range of 100–2000 $m^2/g$, more typically 200–1000 $m^2/g$; total pore volume of 0.1–2 $cm^3/g$, more typically 0.2–1.5 $m^2/g$; and Barrett-Joyner-Halenda (BJH) pore diameter of 5–200 Å, more typically 10–50 Å.

Preferred adsorbents herein are particulate or powdery porous polysilsesquioxanes, and derivatives thereof, that especially are mesoporous, typically having pores of 20–500 Å in diameter. Porous adsorbents include microporous, where typical pore diameters are 0–20 Å and macroporous, where typical pore diameters are greater than about 500 Å. Preference for porosity or pore size in the adsorbent depends on the size of the molecule to be adsorbed since a large molecule. cannot be accommodated in a small pore. The especially preferred adsorbents are the arylene-bridged polysilsesquioxanes containing siloxane, ethylene, and arylene functional groups. The high affinity of this material for phenolic compounds is probably due to interactions beteen one or more of these groups and the phenolic species. Based on these observations, it is believed that π-π interactions between the aromatic rings of the arylene-bridged sorbent and the phenolic compounds play an important role in the binding between them.

Polysilsesquioxanes are hybrid organic-inorganic polymers that contain organic moieties covalently bonded to siloxane groups. Typically, they have been synthesized by the hydrolysis and condensation of organic poly (alkoxysilyl) monomers. The use of the surfactant template approach in order to create polysilsesquiocanes with ordered, mesoporous structures have typically been used. A wide variety of organic bridging groups can be used to give these materials various properties. This ability to design polymeric materials that exhibit specific combinations of organic and inorganic properties gives polysilsesquioxanes the potential for many applications.

Figure 2:
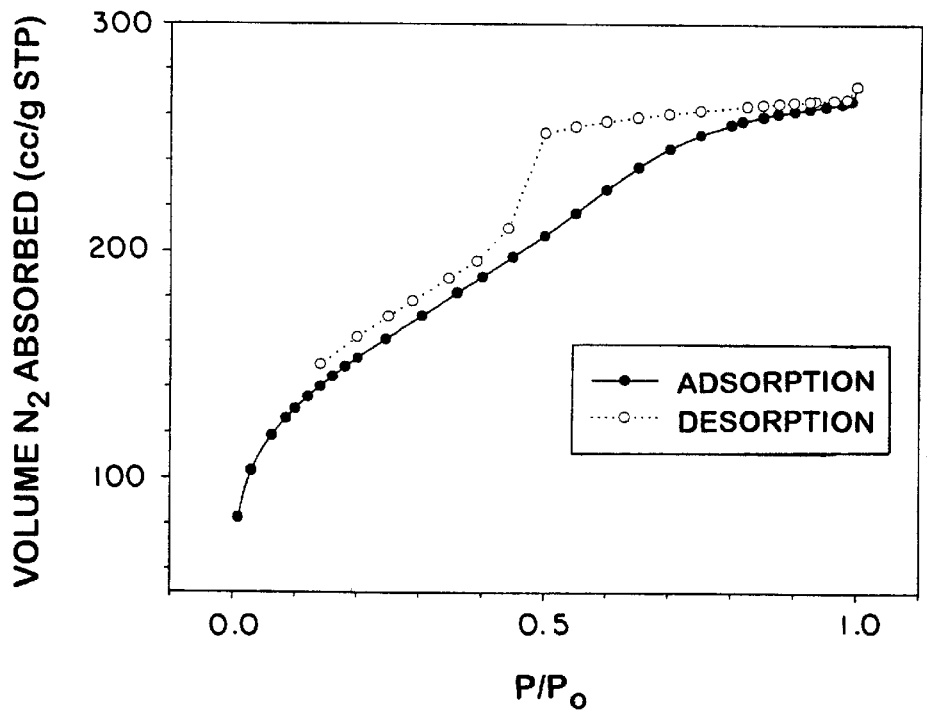
FIG. 2 shows a nitrogen adsorption/desorption isotherm of the arylene-bridged polysilsesquioxane

Preparation of the monomeric silsesquioxane adsorbents can be carried out conventionally pursuant to known procedure by using a substance to enhance porosity. What is produced is the organosilane monomeric precursor liquid 1,4-bis(trimethoxysilylethyl)benzene, shown in FIG. 1. Polymerization of the monomeric precursor can be accomplished by acid or base catalyzed hydrolysis by stirring the mixture at room temperature for couple of hours until gelation takes place, indicating initial polymerization. To cause completion of polymerization, the gel is then heated for a couple of days at an elevated temperature below 100° C. and above about 30° C. The resulting synthesized material is placed in an alcoholic solution containing a strong acid and refluxed for in excess of about 10 hours to remove the surfactant. The polysilsesquioxane adsorbent can then be recovered, as by suction filtration, washed with a lower alcohol, and air dried. What results is a solid and porous polysilsesquioxane that can be characterized by nitrogen sorption at 77 K. Resulting adsorption/desorption typically yields type IV isotherms, shown in FIG. 2.

The adsorbent is a porous solid that can be in monolithic or particulate or powdery form.

The initial step in removing at least one contaminant/pollutant from contaminated material or a carrier containing an adsorbate is to mix the adsorbent with the polluted material. The adsorbent is typically particulate and porous in powder form whereas the adsorbate is typically a liquid carrier. The adsorbate can also be a gas or a solid.

If the adsorbate is a gas, or a mixture thereof, associated with a liquid, another gaseous or a solid carrier, the contaminated carrier is passed through a porous adsorbent and the adsorbate is thus extracted from the contaminated carrier by the adsorbent. The contaminant(s) is subsequently separated from the adsorbent by a regeneration procedure.

If the adsorbate is a solid, or a mixture thereof, the contaminant adsorbate is typically separated from the solid adsorbate by passing a liquid medium through the adsorbate disposed in or on a carrier in order to extract the adsorbate and then the adsorbate is extracted by the adsorbent in the usual manner.

If the adsorbate is associated with a water/liquid carrier, or is in a solvent carrier, the contaminated carrier is treated for removal of the adsorbate, and then this situation is similar to the situation where a liquid is used to extract contaminant(s) from a solid carrier. In either case, the liquid medium, i.e., water or liquid containing contaminant(s), is contacted with the adsorbent whereby the adsorbent adsorbs the contaminant(s) and then the polluted or contaminated adsorbent is separated into adsorbent and contaminant(s) by a regeneration procedure.

The adsorbate is typically in the liquid form. The adsorbate is a pollutant or a contaminant, or a mixture thereof, which it is desired to remove at least partially from the carrier. Adsorbates contemplated herein include aromatics and saturated and unsaturated heterocyclics, particularly monocyclic heterocyclics containing 2–6 carbon atoms, typically 3–4 carbon atoms; and 3–6 non-carbon atoms, typically 3–4 non-carbon atoms, such as nitrogen atoms, in the single ring structure. More specifically, the adsorbates preferably include benzene and phenolic compounds, especially liquid toxic compounds containing a phenol group, such as nitrophenols, particularly 4-nitrophenol; halogenphenols, particularly 4-chlorophenol; and loweralkylphenols, particularly 4-methylphenol.

The adsorption procedure described herein is typically carried out at room temperature and pressure conditions although the conditions can be below or above room temperature and below or above atmospheric pressure, such as the prevailing surrounding conditions. Amount of adsorbent should be sufficient to remove pollutant(s) or contaminant(s) and typically should be in excess of the adsorbate, typically 1–500%, more typically 50–200%, based on the weight of the adsorbate, taking into account the loading factor which is typically in the range of 2–30%, more typically 5–20%, by weight. The loading factor noted herein refers to the weight of adsorbate that can be adsorbed or taken up by the adsorbent.

Figure 5:
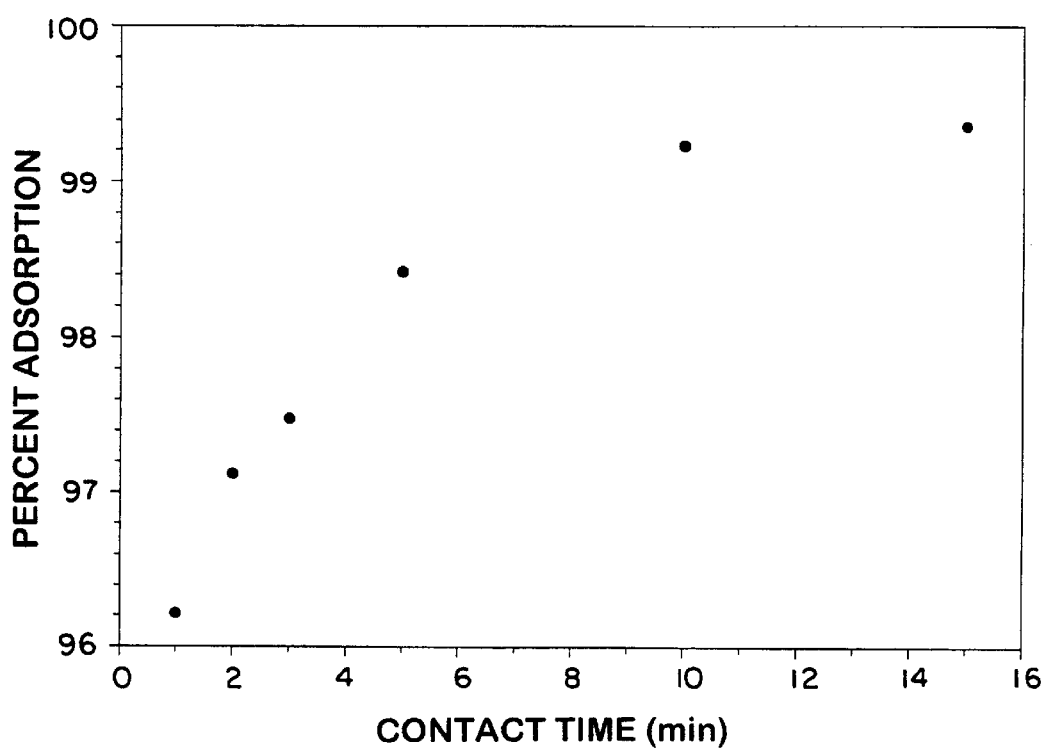
FIG. 5 shows adsorption kinetics of 4-nitrophenol on the arylene-bridged polysilsesquioxane.

The adsorption period is typically from about 1 second to about one hour, more typically 1–30 minutes, and most typically 1–15 minutes. Adsorption can be accomplished by batch or column procedures. More specifically, the adsorption kinetics of 4-nitrophenol by the arylene-bridged sorbent were investigated by performing batch procedures for specific contact times. As shown in FIG. 5, greater than 96% of the 4-nitrophenol was adsorbed during the first minute. A 15 minute contact time resulted in the removal of more than 99% of the adsorbate.

Important goals in the development of sorbent materials include simple regeneration and adsorbate isolation. Regeneration allows for the repeated use of the sorbent materials, decreasing costs and solid waste production. Isolation of adsorbate molecules can allow for their reuse or efficient disposal.

Regeneration of a loaded adsorbent, i.e., an adsorbent containing contaminant(s), can be accomplished by a lower alcohol wash or by thermal desorption. The alcohol wash regeneration can be accomplished in a period of time of up to one hour, more typically in a time period of 1–15 minutes at room conditions. Also, in the case of the alcohol wash, the regenerated adsorbent can be separated from the filtrate by filtration, with the filtrate containing greater than 95%, by weight, especially greater than about 99%, by weight, of at least one pollutant. The filtrate can be analyzed by UV/vis spectroscopy to determine amount of contaminants that were removed. The alcohol can be recovered from the filtrate by distillation.

The high solubility of the aromatics and heterocyclics, especially phenolics, by lower alcohols, particularly ethanol, leads to desorption back into liquid phase. Desorption of the adsorbate molecules from the loaded polysilsesquioxane adsorbents using lower alcanols is rapid.

If regeneration is done by thermal desorption, then the loaded adsorbent is heated under vacuum or reduced pressure to drive off the contaminant(s). The adsorbent is typically heated at a temperature ranging from 30–150° C., more typically 40–80° C., for a period of time typically ranging from 1 minute to 2 hours, more typically from 5 minutes to one half hour.

Having described the invention, the following examples are given as particular embodiments thereof and to demonstrate the practice and advantages thereof. It is understood that the examples are given by way of illustration and are not intended to limit the specification of the claims in any manner.

EXAMPLE 1

This example demonstrates preparation of an arylene-bridged polysilsesquioxane adsorbent, shown in FIG. 1, by the hydrolysis and condensation of alkoxysilyl precursor under basic conditions. Cetyltrimethyl ammonium chloride surfactant was used to increase porosity and surface area of this adsorbent via the surfactant template approach. Structural characterization of this adsorbent was carried out by nitrogen gas sorption and x-ray diffraction.

In this prior art synthesis, 6 ml of cetyltrimethyl ammonium chloride (2.5 weight %) and 2.6 ml of a 25% sodium hydroxide were added with stirring to 100 ml of deionized water in a flask. To this mixture was added 9.4 ml of 1,4-bis(trimethoxysilylethyl)benzene monomer precursor, shown in FIG. 1. Silicate formation was facilitated by the surfactant which promoted formation of surfactant micelle rods and aggregation thereof into hexagonal phase. The reaction flask was stirred for about 2 hours at room temperature until gelation commences, indicating polymerization which was completed by heating the gel at 70° C. for 48 hours. The resulting material was then placed in about 350 ml of ethanol:HCl (12:1 v/v) and refluxed for 12 hours to extract the surfactant, recovered by suction filtration, washed with absolute ethanol, and air dried.

What was obtained was a porous and particulate or powder-like polysilsesquioxane with engineered porosity that was characterized by nitrogen sorption at 77 K. The resulting adsorption/desorption experiments yielded type IV isotherm, shown in FIG. 2 where the arylene-bridged material exhibited a linear region from $P/P_o$ (partial pressure) of about 0.2 to 0.7, characteristic of abroad pore size distribution in the mesoporous range. The hysteresis observed for the desorption branch may indicate the presence of "bottle-necking" in some of the larger pores.

The structural parameters calculated from nitrogen gas sorption measurements of the arylene-bridged polysilsesquioxane prepared above were BET surface area of 550 m$^2$/g, total pore volume of 0.4 cm$^3$/g, and BJH pore diameter of 30 Å.

EXAMPLE 2

This experiment reflects ability of the arylene-bridged polysilsesquioxane sorbent, prepared above, to adsorb 4-nitrophenol, 4-chlorophenol, and 4-methylphenol from separate aqueous solutions.

Figure 3:
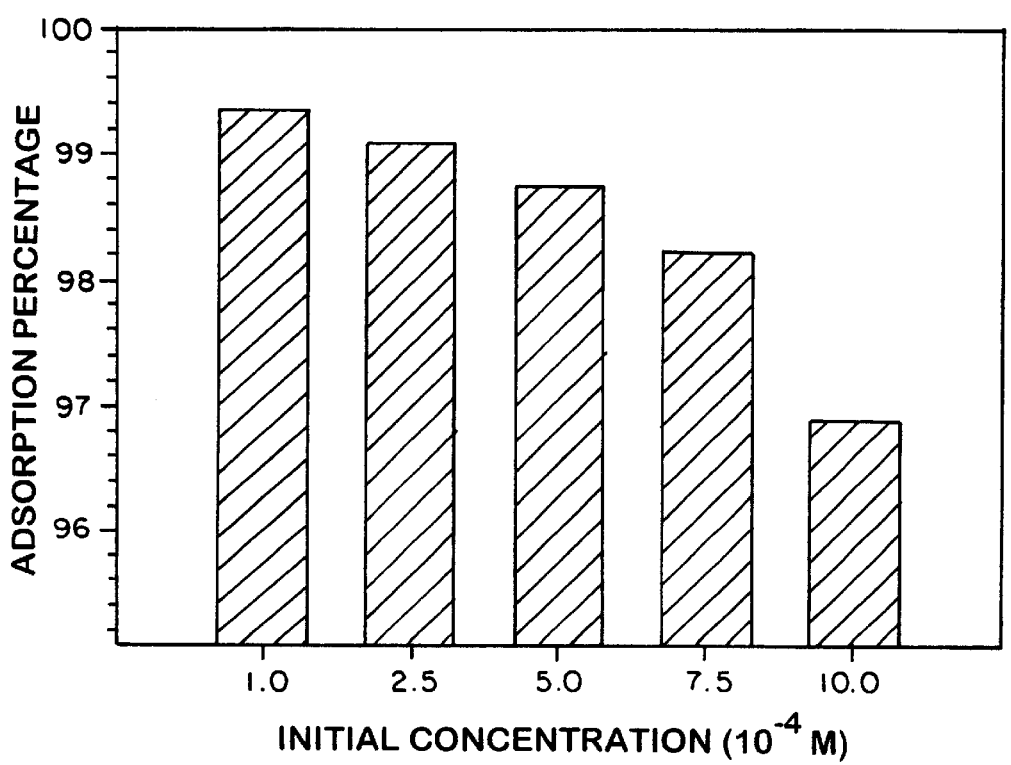
FIG. 3 shows adsorption of 4-nitrophenol adsorbate on the arylene-bridged polysilsesquioxane adsorbent from five aqueous solutions containing 4-nitrophenol in the following concentrations: $1.0 \times 10^{-4}$ M, $2.5 \times 10^{-4}$ M, $5.0 \times 10^{-4}$ M, $7.5 \times 10^{-4}$ M, and $10.0 \times 10^{-4}$ M.

Pursuant to the procedure, 0.1 g of the sorbent was mixed with 10 ml of a standardized phenolic aqueous solution for 15 minutes. The amount of the phenolic compound was calculated by the difference in concentration between the filtrate and the initial standard solutions, as measured by UV/vis spectroscopy ($\lambda_{max}$=316 nm). As shown in FIG. 3, 0.10 g of the arylene-bridged sorbent removed greater than 99%, on weight basis, of the 4-nitrophenol from 10 ml of the 10$^{-4}$ M aqueous solution.

Table 1, below, compares adsorption or uptake of 4-chlorophenyl and 4-methylphenyl compared to 4-nitrophenyl from aqueous solutions ranging from 10$^{-4}$ to 10$^{-3}$ M:

TABLE 1

| Initial Phenol Concentration (M) | Adsorbed 4-NP (%) | Adsorbed 4-CP (%) | Adsorbed 4-MP (%) |
|---|---|---|---|
| $1.0 \times 10^{-4}$ | 99.36 | 98.56 | 97.89 |
| $2.5 \times 10^{-4}$ | 99.09 | 98.31 | 97.16 |
| $5.0 \times 10^{-4}$ | 98.74 | 97.45 | 96.31 |
| $7.5 \times 10^{-4}$ | 98.21 | 95.30 | 95.22 |
| $1.0 \times 10^{-3}$ | 96.90 | 90.02 | 92.38 |

In the above Table 1, 4-NP is 4-nitrophenol, 4-CP is 4-chlorophenol, and 4-MP is 4-methylphenol.

Figure 4:
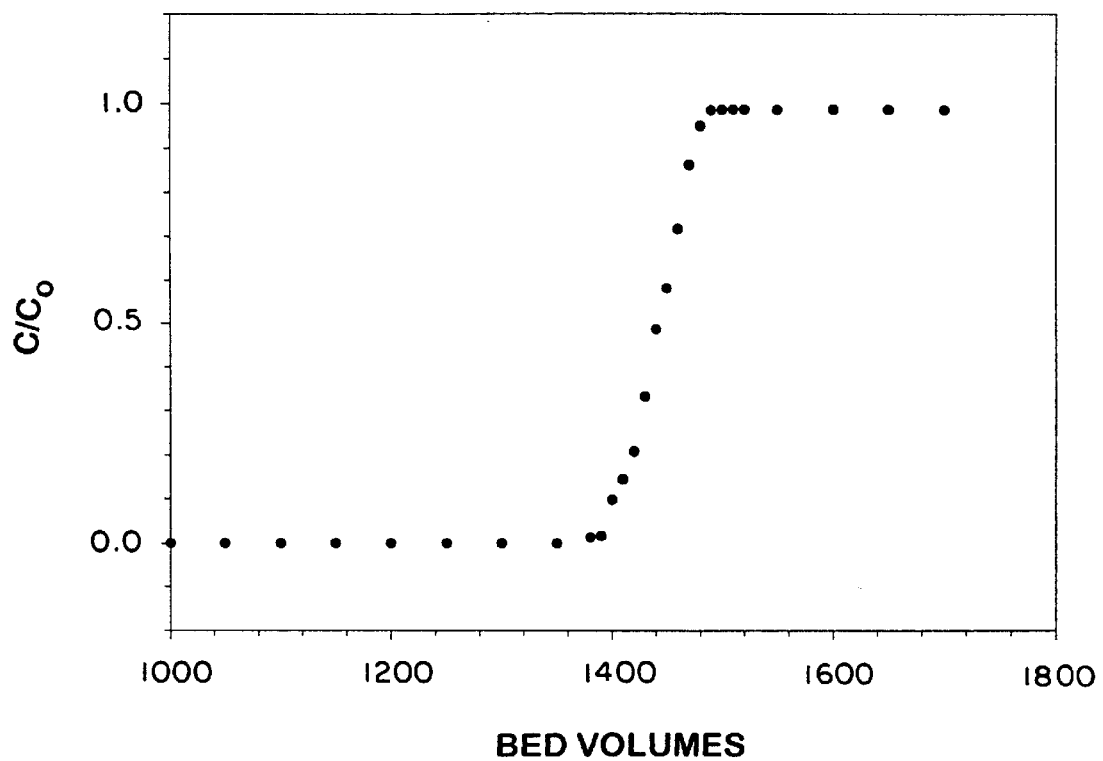
FIG. 4 shows breakthrough curve of 4-nitrophenol on the arylene-bridged polysilsesquioxane column.

Column tests were also performed with the arylene-bridged sorbent using $10^{-4}$ M solution of 4-nitrophenol as the eluent. The effluent was monitored for the presence of 4-nitrophenol. The column exhibited breakthrough at 1400 bed volumes (ml), as shown in FIG. 4. This corresponds to an adsorption capacity of approximately 130 mg/g or 13 weight percent. This example demonstrates that the arylene-bridged polysilsesquioxane is a very efficient phenolic adsorbent and that polysilsesquioxane formed with aromatic bridging group is much more efficient adsorber of aromatic compounds than polysilsesquioxanes containing a non-arylene bridging group.

EXAMPLE 3

The adsorption kinetics of 4-nitrophenol by the arylene-bridged sorbent, prepared above, was performed by batch procedures for specific contact times, as noted in FIG. 5. Greater than 96% of the 4-nitrophenol was adsorbed during the first minute of contact time. A 15-minute contact time resulted in the removal of more than 99% of the adsorbate 4-nitrophenol.

EXAMPLE 4

This example demonstrates rapid sorbent regeneration whereby the arylene-bridged polysilsesquioxane sorbent prepared above and loaded with 4-nitrophenol is subjected to and aqueous solution of a lower alcohol wash.

Pursuant to the regeneration procedure, a 0.10 g sample of the sorbent that had adsorbed in 15 minutes greater than 99%, on weight basis, of the 4-nitrophenol from a 10 ml aliquot of an aqueous $10^{-4}$ M solution was placed in 10 ml of absolute ethanol for 15 minutes. The regenerated sorbent was then separated by filtration. Analysis of the filtrate by UV/vis spectroscopy showed that greater than 95% of the 4-nitrophenol adsorbate was removed from the arylene-bridged polysilsesquioxane. The ethanol was recovered from the filtrate by distillation, leaving residual 4-nitrophenol.

While presently preferred embodiments have been shown of the novel adsorption and regeneration, and of the several modifications discussed, persons skilled in this art will readily appreciate that various additional changes and modifications may be made without departing from the spirit of the invention as defined and differentiated by the following claims.

What is claimed is:

1. A method of regenerating an adsorbent containing an adsorbate comprising the step of removing the adsorbate from the adsorbent by a technique selected from the group consisting of an alcohol wash, thermal desorption, and mixtures thereof, wherein the adsorbent is a porous polymer made from one or more monomers having the structural formula:

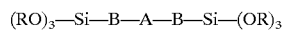

$$(RO)_3-Si-B-A-B-Si-(OR)_3$$

wherein A group is a divalent arylene group; B groups are same or different, saturated or unsaturated, hydrocarbon groups; and R groups are same or different, saturated or unsaturated, monovalent hydrocarbon groups; and wherein the adsorbate is selected from the group consisting of aromatics, heterocyclics, and mixtures thereof; and wherein the adsorbate is selected from the group consisting of aromatics, heterocyclics, and mixtures thereof.

2. The method of claim 1 wherein in the structural formula for the adsorbent, A group is phenylene, B groups are same saturated groups containing 1–6 carbon atoms, and R groups are also same saturated groups containing 1–6 carbon atoms; and wherein the alcohol in the alcohol wash is a liquid lower alcohol containing 1–6 carbon atoms and the thermal desorption is carried out at reduced pressure and at elevated temperature.

3. The method of claim 2 wherein in the structural formula for the adsorbents B groups contain 1 to 2 carbon atoms and R groups also contain 1 to 2 carbon atoms; and the adsorbate is selected from phenolic compounds and monocyclic heterocyclic compounds containing 3–6 carbon atoms and 3–6 non-carbon atoms in the cyclic group.

4. The method of claim 3 wherein the non-carbon atoms in the heterocyclic compound are nitrogen atoms.

5. The method of claim 4 wherein the adsorbent is a phenolic liquid compound associated with a water carrier.

6. The method of claim 5 wherein separation of the adsorbate from the adsorbent is accomplished in a period of time of up to 1 hour at a temperature of 30–150° C.

7. The method of claim 5 wherein separation of the adsorbate from the adsorbent is accomplished in a period of time of 1–15 minutes at 40–80° C. at atmospheric pressure where greater than 95%, on weight basis, of the adsorbate is separated from the adsorbent.

* * * * *